United States Patent
Chen

(10) Patent No.: US 11,335,278 B2
(45) Date of Patent: May 17, 2022

(54) SELF-ADAPTIVE ADJUSTMENT METHOD BASED ON AMBIENT LIGHT DISTRIBUTION FIELD

(71) Applicant: GUANGDONG XIAYE HOUSEHOLD ELECTRICAL APPLIANCES CO., LTD, Guangdong (CN)

(72) Inventor: Ziping Chen, Guangdong (CN)

(73) Assignee: GUANGDONG XIAYE HOUSEHOLD ELECTRICAL APPLIANCES CO., LTD., Guangdong (CN)

( * ) Notice: Subject to any disclaimer, the term of this patent is extended or adjusted under 35 U.S.C. 154(b) by 0 days.

(21) Appl. No.: 17/309,939

(22) PCT Filed: Jan. 3, 2019

(86) PCT No.: PCT/CN2019/070301
§ 371 (c)(1),
(2) Date: Jul. 1, 2021

(87) PCT Pub. No.: WO2020/140241
PCT Pub. Date: Jul. 9, 2020

(65) Prior Publication Data
US 2022/0076640 A1 Mar. 10, 2022

(51) Int. Cl.
*G09G 3/34* (2006.01)
(52) U.S. Cl.
CPC ... *G09G 3/3406* (2013.01); *G09G 2320/0626* (2013.01); *G09G 2354/00* (2013.01); *G09G 2360/144* (2013.01)
(58) Field of Classification Search
CPC ......... G09G 3/3406; G09G 2320/0626; G09G 2354/00; G09G 2360/144
See application file for complete search history.

(56) References Cited

U.S. PATENT DOCUMENTS

| | | | | |
|---|---|---|---|---|
| 2007/0247544 | A1* | 10/2007 | Imamura | H04N 5/23245 386/E5.072 |
| 2011/0032228 | A1* | 2/2011 | Ho | G09G 3/20 345/207 |

(Continued)

FOREIGN PATENT DOCUMENTS

| | | |
|---|---|---|
| CN | 105138268 A | 12/2015 |
| CN | 105446497 A | 3/2016 |
| CN | 108989539 A | 12/2018 |

*Primary Examiner* — Benyam Ketema
(74) *Attorney, Agent, or Firm* — Welsh Flaxman & Gitler LLC

(57) ABSTRACT

A self-adaptive adjustment method based on an ambient light distribution field comprises: obtaining a background image of a background environment in a viewing angle range of a user (101); obtaining pixel information of a single pixel point/multi-pixel-point block in the background image (102); calculating/extracting illumination information of the single pixel point/the multi-pixel-point block from the pixel information (103); obtaining continuous background image illumination field information according to the illumination information (104); performing matching calculation on the background image brightness field information and preset illumination field distribution models to obtain a corresponding first illumination field distribution model (105); querying a model-parameter list to obtain a first adjustment parameter corresponding to a first illumination field distribution model (106); and adjusting a display parameter of a display screen of a user terminal and/or adjusting a light supplementation output parameters of a lighting compensation device, so that the display parameters of the display screen match the illumination state of the background environment in the viewing angle range of the user (107).

10 Claims, 1 Drawing Sheet

(56) References Cited

U.S. PATENT DOCUMENTS

| | | | | |
|---|---|---|---|---|
| 2011/0074752 A1* | 3/2011 | Kikuchi | ............... | H04N 5/2354 |
| | | | | 345/207 |
| 2011/0134091 A1* | 6/2011 | Chen | .................... | G09G 3/3406 |
| | | | | 345/207 |
| 2011/0181541 A1* | 7/2011 | Kuo | ........................ | H04M 1/22 |
| | | | | 348/78 |
| 2011/0187733 A1* | 8/2011 | Sun | ........................ | G06T 5/009 |
| | | | | 345/589 |
| 2013/0314433 A1* | 11/2013 | Ko | ........................ | G09G 5/026 |
| | | | | 345/592 |
| 2013/0321643 A1* | 12/2013 | Fujinawa | ................ | G06F 3/005 |
| | | | | 348/169 |
| 2015/0070406 A1* | 3/2015 | Baek | .................... | G09G 3/3406 |
| | | | | 345/88 |
| 2020/0126494 A1* | 4/2020 | Chen | ........................ | G09G 5/10 |
| 2020/0311427 A1* | 10/2020 | Kato | ....................... | G06V 10/30 |

* cited by examiner

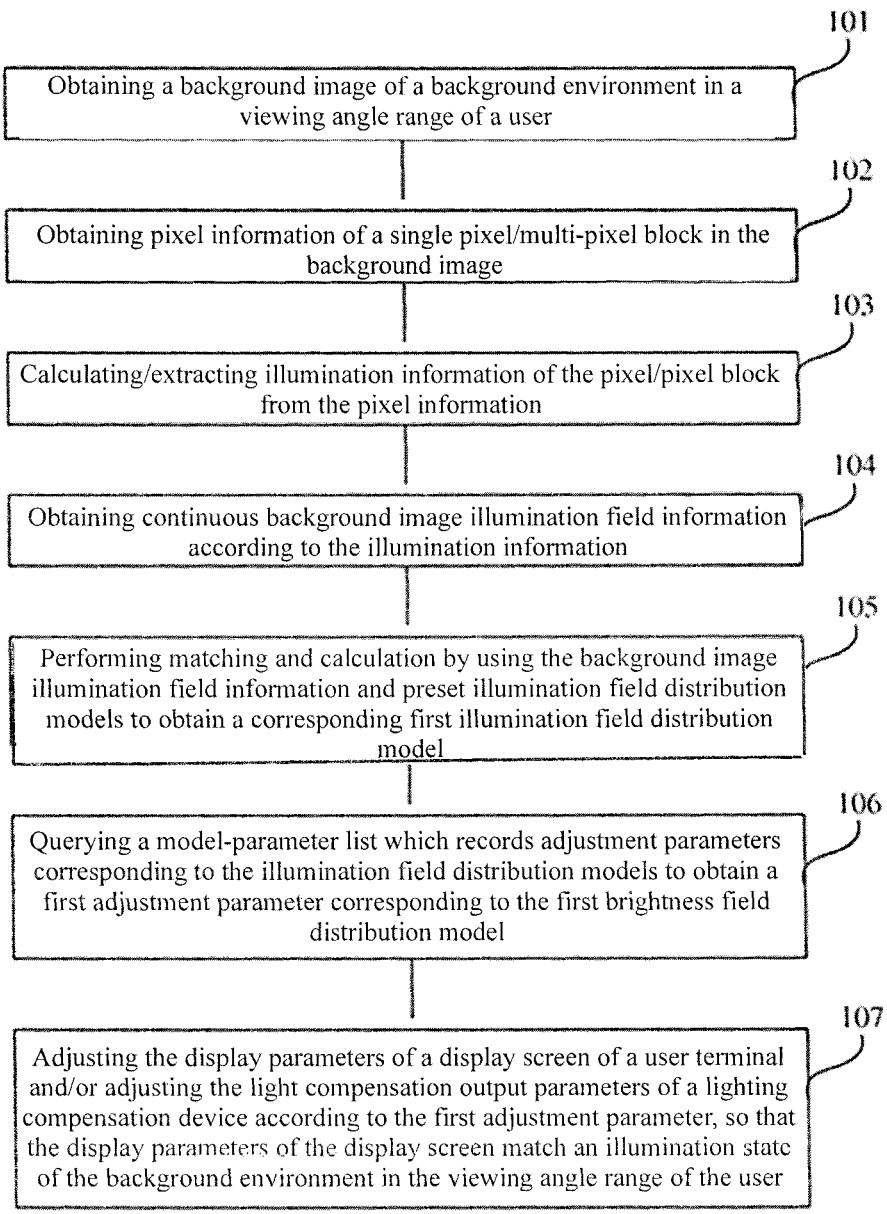

SELF-ADAPTIVE ADJUSTMENT METHOD BASED ON AMBIENT LIGHT DISTRIBUTION FIELD

BACKGROUND OF THE INVENTION

1. Technical Field

The invention relates to a self-adaptive adjustment method based on an ambient light distribution field, in particular to a self-adaptive adjustment method for realizing an ambient light distribution field according to the illumination of a background image.

2. Description of Related Art

This era has seen constant emergence of various electronic devices. People spend most of their leisure time on computers, smart phones, televisions and other electronic devices. Besides, with the advancement of digital working and teaching, office workers and students spend a lot of time staring at computer screens and projection screens every day. After frequent and long-time looking at the display screens of mobile phones, computers and other terminals, eye strain can be caused, which further leads to decreased vision and affects visual health.

Mobile terminals (mobile phones), notebook computers, desktop computers, televisions, etc., are often used by people. However, the display screens of these electronic devices rarely have adaptive illumination. For example, most televisions and computers do not have adaptive illumination. Although mobile phones have an automatic illumination adjustment function based on a illumination sensor, there are several problems in its adjustment mode:

1. At present, most smart phones with the automatic illumination adjustment mode detect the illumination of the background environment identifying the ambient light with a illumination sensor, and then calculate the screen display illumination according to a preset algorithm; the illumination sensors of mobile phones are typically disposed on the front of mobile phones, that is, facing the users, while the visual background of the users faces the back of mobile phones; as a result, the illumination sensor cannot really perceive the background environment from the users' perspective, which is one limitation of the current automatic illumination adjustment method of display screens;

2. The illumination sensor of the mobile phone is a point, which can only sense the illumination irradiated by this point, but the user's background is a plane, so the sensor cannot reflect the whole use background faced by the user;

3. The illumination adjustment of mobile phones is based on the light of the illumination sensor, so it is assumed the light is evenly distributed, but the reality is that the users' background light intensity cannot be uniform all the time, and the use background has illumination field distribution.

BRIEF SUMMARY OF THE INVENTION

In view of the defects of the prior art, the purpose of the present invention is to provide a self-adaptive adjustment method based on an ambient light distribution field, which can realize self-adaptive adjustment based on the ambient light distribution field after analyzing and processing the illumination of pixel points/pixel blocks of a background image.

To achieve the above purpose, the present invention provides a self-adaptive adjustment method based on an ambient light distribution field, which comprises the following steps:

obtaining a background image of a background environment in a viewing angle range of a user;

obtaining pixel information of a single pixel/multi-pixel block in the background image;

Calculating/extracting illumination information of the pixel/pixel block from the pixel information;

Obtaining continuous background image illumination field information according to the illumination information;

performing matching calculation by using the background image illumination field information and preset illumination field distribution models to obtain a corresponding first illumination field distribution model;

querying a model-parameter list which records adjustment parameters corresponding to the illumination field distribution models to obtain a first adjustment parameter corresponding to the first illumination field distribution model; and Adjusting the display parameters of a display screen of a user terminal and/or adjusting the light compensation output parameters of a lighting compensation device according to the first adjustment parameter, so that the display parameters of the display screen match an illumination state of the background environment in the viewing angle range of the user.

Preferably, in the step of calculating illumination information of the pixel/pixel block from the pixel information.

The pixel information includes color information, and the illumination information of the pixel/pixel block is calculated according to the color information.

Preferably, performing matching calculation by using the background image illumination field information and preset illumination field distribution models to obtain a corresponding first illumination field distribution model specifically comprises:

Matching the background image illumination field information with the preset illumination field distribution models to obtain one or more matching models and matching coefficients; and Performing model correction and calculation based on each matching model and matching coefficient to obtain the first illumination field distribution model.

Further preferably, performing model correction calculation based on each matching model and matching coefficient to obtain the first illumination field distribution model comprises:

Determining a matching model with the highest matching coefficient as a model to be corrected; and performing deviation correction calculation on the model to be corrected according to other models, except the matching model to be corrected, of the plurality of matching models and corresponding matching coefficients to obtain the first illumination field distribution model.

Further preferably, performing model correction calculation based on each matching model and matching coefficient to obtain the first illumination field distribution model comprises:

Weighting the model parameters of the matching models according to the matching coefficients to obtain weighted model parameters; and Generating the first illumination field distribution model according to the weighted model parameters.

Further preferably, performing model correction calculation based on each matching model and matching coefficient to obtain the first illumination field distribution model comprises:

Selecting the matching model with the highest matching coefficient as the first illumination field distribution model.

Further preferably, after querying the model-parameter list, the method further comprises:

When no illumination model matching the first illumination field distribution model is found, storing the first illumination field distribution model and generating a record; and When the amount of record of the first illumination field distribution model reaches a preset threshold, setting corresponding adjustment parameters for the first illumination field distribution model, and adding the adjustment parameters to the model-parameter list.

Further preferably, the method further comprises:

Determining the RGB color values of each pixel/pixel block according to the color information, and summing the values of a red component, a green component and a blue component in all the RGB color values of the background image to obtain a total chromatic value of each component and a total chromatic value of all the components.

Further preferably, the method further comprises:

Calculating the ratio coefficients of the red component, the blue component and the green component based on the total chromatic value;

querying the correction parameters corresponding to the red component, the blue component and the green component;

Taking the product of the ratio coefficient of the red component and the correction parameter of the red component as a first coefficient correction parameter of the red component;

Taking the product of the ratio coefficient of the green component and the correction parameter of the green component as a second coefficient correction parameter of the green component;

Taking the product of the ratio coefficient of the blue component and the correction parameter of the blue component as a third coefficient correction parameter of the blue component; and Correcting the first adjustment parameter according to the first coefficient correction parameter, the second coefficient correction parameter and the third coefficient correction parameter, and adjusting the display parameters of a display screen of a user terminal and/or adjusting the light compensation output parameters of a lighting compensation device according to the corrected first adjustment parameter, so that the display parameters of the display screen match an illumination state of the background environment in the viewing angle range of the user.

Further preferably, the method further comprises: calling a first sensitivity parameter, a second sensitivity parameter and a third sensitivity parameter corresponding to the red component, the green component and the blue component respectively;

Taking the product of the ratio coefficient of the red component and the correction parameter of the red component as a first coefficient correction parameter of the red component, the product of the ratio coefficient of the green component and the correction parameter of the green component as a second coefficient correction parameter of the green component, and the product of the ratio coefficient of the blue component and the correction parameter of the blue component as a third coefficient correction parameter of the blue component specifically comprises:

Taking the product of the ratio coefficient of the red component, the correction parameter of the red component and the first sensitivity parameter as a first sensitization coefficient correction parameter of the red component; taking the product of the ratio coefficient of the green component, the correction parameter of the green component and the second sensitivity parameter as a second sensitization coefficient correction parameter of the green component; and taking the product of the ratio coefficient of the blue component, the correction parameter of the blue component and the third sensitivity parameter as a third sensitization coefficient correction parameter of the blue component;

Correcting the first adjustment parameter according to the first coefficient correction parameter, the second coefficient correction parameter and the third coefficient correction parameter comprises: correcting the first adjustment parameter according to the first sensitization coefficient correction parameter, the second sensitization coefficient correction parameter and the third sensitization coefficient correction parameter;

Wherein the first sensitivity parameter is a first standardized sensitivity parameter or a first personalized sensitivity parameter, the second sensitivity parameter is a second standardized sensitivity parameter or a second personalized sensitivity parameter, and the third sensitivity parameter is a third standardized sensitivity parameter or a third personalized sensitivity parameter; and When a correction ratio of the first adjustment parameter exceeds a set ratio, the method further comprises:

Updating the correction parameters corresponding to the red component, the blue component and the green component according to the first sensitization coefficient correction parameter, the second sensitization coefficient correction parameter and the third sensitization coefficient correction parameter.

The self-adaptive adjustment method based on the ambient light distribution field realizes self-adaptive adjustment based on the ambient light distribution field after analyzing and processing the illumination of pixel points/pixel blocks of the background image.

BRIEF DESCRIPTION OF THE SEVERAL VIEWS OF THE DRAWINGS

FIG. 1 is a flowchart of a self-adaptive adjustment method based on an ambient light distribution field provided by an embodiment of the invention.

DETAILED DESCRIPTION OF THE INVENTION

The technical solution of the present invention will be described in further detail below with reference to the drawings and embodiments.

The embodiment of the invention provides a self-adaptive adjustment method based on an ambient light distribution field, which is used to adjust the display parameters of a display screen of a user terminal in a self-adaptive manner and/or adjust the light compensation output parameters of a lighting compensation device based on the background environment in a viewing angle of a user, so that the display parameters of the display screen match an illumination state of the background environment in the visual angle range of the user.

When the user watches the display screen, the background environment has a great influence on the visual effect of the display screen. When a person watches an object, the size of the pupils adapts to the illumination level of the object, and the size of the display screen accounts for less than 10% of the visual range.

For example, when a mobile phone with a 5-inch display screen is used normally, the display screen of the mobile phone occupies less than 2% of the visual range of human eyes. For another example, when a computer with a 20-inch display screen is used, the display screen occupies less than 6% of the visual range of human eyes.

Therefore, in different external environments, if the display screen can be adjusted for display according to the display parameters such as illumination and color temperature of the external environment, especially the environment in the user's viewing angle, the visual health of the user can be protected to a certain extent.

The equipment on which the above display screen is mounted can be collectively referred to as an information terminal, which can specifically include, but is not limited to, smart phones, personal digital assistants (PAD), desktop computers, televisions and projectors.

The self-adaptive adjustment method based on the ambient light distribution field can be applied to various visual environments, which is specifically described as follows:

1. The user uses an electronic device with a screen, such as mobile terminal (cell phone), television or display. According to the invention, two types of adjustment can be made by analyzing the illumination of a background image of the user, the first one is to adjust the illumination of the display according to the illumination of the background image, and the second one is to adjust the illumination of the background image according to the illumination of the display.

2. The user does not use an electronic device with a screen, but can use the electronic device to collect a background image, and adjust the illumination of the background image as needed.

FIG. 1 is a flowchart of a self-adaptive adjustment method based on an ambient light distribution field provided by the invention. As shown in the figure, the invention specifically comprises the following steps:

Step 101, acquiring a background image of a background environment in a viewing angle range of a user.

Specifically, there are many ways to acquire the image of the background environment. In the present embodiment, the background image data of the environment can be obtained by directly shooting with a camera. In the present embodiment, the background image data of the background environment of the user may be acquired by other devices and sent to a user terminal.

It should be noted that the size of the background image can be consistent with the current visual field range of the user, that is, the visual field of the user's current viewing angle; preferably, the background image is larger than the visual field of the user, that is, the image of the background environment acquired within the possible viewing angle range of the user is as complete as possible. The reason is that the user's head or eyes may move, making the size of the background image consistent with the possible viewing angle range of the user, that is, larger than the current viewing angle of the user.

In the self-adaptive adjustment method based on the ambient light distribution field in the embodiment of the present invention, there is no special requirement for the definition of the background image, because what is most needed is the illumination field information of the background image, and the definition is not particularly concerned, that is to say, the image definition may be large or small.

Step 102, acquiring pixel information of a single pixel/multi-pixel block in the background image.

Generally, the images acquired by existing image acquisition equipment are digitized images, so the pixel information of each pixel in the image can be obtained, such as the YUV value of the pixel or the RGB value of the pixel. Of course, the value of the pixel block can be obtained from the value of the pixel, the pixel block can be divided manually or automatically in many dividing ways, such as 2×2, 3×3 and 5×5 square pixel blocks, or 1×2 and 6×4 non-square pixel blocks. If the pixels at an edge of the image cannot form a complete pixel block, the information of these pixels can be discarded without processing.

The value of the pixel block can be calculated from the value of each pixel, for example, the average value of RGB or YUV of the pixel block.

Step 103, calculating/extracting illumination information of the pixel/pixel block from the pixel information.

Specifically, the illumination information of the pixels or pixel blocks can be obtained through direct extraction. If the pixel is calibrated or expressed by the YUV value, the Y value is used as the illumination value of the pixel. Similarly, as for the pixel block, if the YUV value of the pixel block is obtained in the previous step, the Y value of the pixel block is used as the illumination value of the pixel block.

The illumination information of the pixels or pixel blocks can also be obtained through indirect extraction, that is, through conversion. If the pixel is calibrated by the RGB value, the illumination value can be obtained by the RGB value. For example, the YUV value is obtained by various calculations based on the RGB value, and the Y value is taken as the illumination value of the pixel. Similarly, if the pixel block is calibrated by the RGB value, the Y value obtained from the calculated YUV value is taken as the illumination value of the pixel.

Step 104, obtaining continuous background image illumination field information according to the illumination information.

Specifically, after obtaining the illumination value of each pixel of the background image or the illumination value of each image block, the illumination values of the pixels can be spliced to obtain the illumination field information of the whole background image. In the same way, the illumination field information of the whole background image can be obtained by splicing the illumination values of each pixel block.

There is no big difference between the illumination field information of the background image obtained by means of the pixels and that obtained by means of the pixel blocks, the difference is the fineness, and the whole illumination field distribution is the same.

In addition, when collecting images, there may be some deviation between the range of collected images and the visual field range of human eyes, and the visual field range of human eyes is usually larger than the range of an image collected by a camera. In order to solve this problem, the collected images can be spliced, so that the illumination field information of the spliced background image is basically consistent with or matched with the background environment in the viewing angle range of the user.

Step 105, performing matching calculation by using the background image illumination field information and preset illumination field distribution models to obtain a corresponding first illumination field distribution model.

Different types of illumination field distribution models are obtained by summarizing and analyzing various illumination field distributions. This model can be dynamic, that is, the number of models can be not fixed and can be added, for example, manually added, or when a certain number of similar illumination field distribution models are found, a new illumination field distribution model may be generated.

Users can even customize their own illumination field distribution models according to their own preferences.

Specifically, after obtaining the illumination field information of the current background image, the matching degree with a preset illumination field distribution model can be calculated, so as to obtain a corresponding first illumination field distribution model.

Optionally, the illumination field information of the background image is matched with the preset illumination field distribution models to obtain one or more matching models and matching coefficients.

Because it is impossible for every illumination field distribution to be completely consistent with the illumination field distribution model, if the illumination field distribution is completely consistent with the illumination field distribution model, only one illumination field matching model can be obtained, and the matching coefficient is 100%. Under normal circumstances, one illumination field distribution may be matched with multiple illumination field distribution models, so after matching calculation, multiple illumination field distribution models can be obtained from one illumination field distribution, and each illumination field distribution model also has its own matching coefficient, as shown in Table 1,

| No. | Reference No. of illumination matching model | Matching coefficient (%) |
| --- | --- | --- |
| 1 | 103 | 70 |
| 2 | 214 | 20 |
| 3 | 357 | 10 |

Then model correction calculation is performed based on each matching model and matching coefficient to obtain the first illumination field distribution model.

There are many manners to obtain the first illumination field distribution model by means of different matching models, which will be described in detail below.

In a first manner, a matching model with the highest matching coefficient is determined as a model to be corrected, and deviation correction calculation is performed on the model to be corrected according to other models, except the matching model to be corrected, of the plurality of matching models and corresponding matching coefficients to obtain the first illumination field distribution model.

Specifically, the illumination matching model with reference No. 103 is taken as the model to be corrected, then the illumination matching model with reference No. 214 is used for 20% deviation correction calculation, and the illumination matching model with reference No. 357 is used for 10% deviation correction calculation, so that the first illumination field distribution model is obtained by means of the matching model with reference No. 103.

In a second manner, the model parameters of the matching models are weighted according to the matching coefficients to obtain weighted model parameters, and the first illumination field distribution model is generated according to the weighted model parameters.

Specifically, as shown in Table 1, the matching coefficient 70% of the illumination matching model with reference No. 103 is taken as the weighting coefficient, the matching coefficient 20% of the illumination matching model with reference No. 214 is taken as the weighting coefficient, and the matching coefficient 10% of the illumination matching model with reference No. 357 is taken as the weighting coefficient, thus obtaining the first illumination field distribution model.

In a third manner, the matching model with the highest matching coefficient is selected as the first illumination field distribution model.

The illumination matching model with reference No. 103 has a matching coefficient of 70%, which is the highest matching coefficient, so this illumination model is taken as the first illumination field distribution model.

Step 106, looking into a model-parameter list which records adjustment parameters corresponding to the illumination field distribution models to obtain a first adjustment parameter corresponding to the first illumination field distribution model.

Specifically, the model-parameter list records the illumination field distribution models and the corresponding adjustment parameters, and the corresponding relationship between them.

The number of the illumination field distribution models is limited and can be dynamically added, or illumination field models can be added dynamically, manually or automatically.

The corresponding adjustment parameters are the adjustment parameters corresponding to this illumination field distribution model. There are two types of adjustment parameters, namely display parameters and the light compensation output parameters for the lighting compensation device.

Particularly, when no illumination model matched with the first illumination field distribution model is found, the first illumination field distribution model is stored and a record is generated; and when the record of the first illumination field distribution model reaches a preset threshold, corresponding adjustment parameters are set for the first illumination field distribution model, and added to the model-parameter list.

That is to say, when a certain illumination field distribution model appears multiple times, it is considered that this illumination field distribution model often appears. After being optimized, the illumination field distribution model is added to the model-parameter list as a standard illumination field distribution model, and an adjustment parameter is given to the illumination field distribution model.

Step 107, adjusting the display parameters of a display screen of a user terminal and/or adjusting the light compensation output parameters of a lighting compensation device according to the first adjustment parameter, so that the display parameters of the display screen match with an illumination state of the background environment in the viewing angle range of the user.

According to the searched first adjustment parameter, the display screen can be adjusted, or light compensation adjustment is performed on the lighting compensation device to match background light with required light.

It should be noted that the above adjustment mode does not consider the adjustment of the sensitivity of the user to the color of the background image, because human eyes are sensitive to color besides illumination, and specific processing is as follows:

Determining the RGB color values of each pixel/pixel block according to the color information, and summing the values of a red component, a green component and a blue component in all the RGB color values of the background image to obtain a total chromatic value of each color component and a total chromatic value of all the components.

Specifically, after the background image is obtained, the RGB color value of each pixel/pixel block is obtained, and then the components of the RGB values of each pixel/pixel block are summed to obtain the total chromatic value $\Sigma R$ of the red R value component, the total chromatic value $\Sigma G$ of the green G value component and the total chromatic value $\Sigma B$ of the blue B value component of the background image, and the total chromatic value $\Sigma = \Sigma R + \Sigma G + \Sigma B$.

The ratio coefficients of the red component, the blue component and the green component are calculated based on the total chromatic value.

Specifically, the ratio coefficient of the red component is $CR = \Sigma R/\Sigma$, the ratio coefficient of the green component is $CG = \Sigma G/\Sigma$, and the ratio coefficient of the red component is $CB = \Sigma B/\Sigma$.

The correction parameters corresponding to the red component, the blue component and the green component are inquired.

Specifically, because the levels of sensitivity for people to illumination caused by different colors are different, each color has its own correction parameter T, which is TR for red, TG for green and TB for blue. Generally speaking, the level of sensitivity towards red is the highest, so red corresponds to the largest correction parameter; the level of sensitivity towards blue is the lowest, so blue corresponds to the smallest correction parameter; and the correction parameter of green lies therebetween.

The product of the ratio coefficient of the red component and the correction parameter of the red component is taken as a first coefficient correction parameter of the red component, that is, the first coefficient correction parameter $CTR = CR \times TR$;

The product of the ratio coefficient of the green component and the correction parameter of the green component is taken as a second coefficient correction parameter of the green component, that is, the second coefficient correction parameter $CTG = CG \times TG$;

The product of the ratio coefficient of the blue component and the correction parameter of the blue component is taken as a third coefficient correction parameter of the blue component, that is, the third coefficient correction parameter $CTB = CB \times TB$; and The first adjustment parameter is corrected according to the first coefficient correction parameter, the second coefficient correction parameter and the third coefficient correction parameter, and the display parameters of a display screen of a user terminal and/or the light compensation output parameters of a lighting compensation device are adjusted according to the corrected first adjustment parameter, so that the display parameters of the display screen match with an illumination state of the background environment in the viewing angle range of the user.

In a preferred solution, the first adjustment parameter is obtained after the above step 106, which is an adjustment parameter without considering color. Now that we have different coefficient correction parameters CTR, CTG and CTB of three color components, we can correct the first adjustment parameter, so as to obtain the corrected first adjustment parameter which suits the habit of human eyes more. For example, human eyes are sensitive to red R, so when the R value component of the background environment is large, the illumination value will be considered high. In this case, the illumination value of the display parameters of the display screen can be increased to match the background environment. Therefore, when the illumination of the display screen is adjusted according to the CTR value, the first adjustment parameter should be raised. On the contrary, when the first adjustment parameter is to adjust the light compensation output of the lighting compensation device for background light, it can be considered that the background light is already strong enough, and the intensity of the background light only needs to be adjusted slightly.

The above-mentioned adjustment process takes the general population's sensitivity to color into account, but does not consider personalized color sensitivity. The present invention can also consider the personalized color sensitivity when adjusting and correcting the display parameters. Specific processing is as follows:

Calling a first sensitivity parameter MR, a second sensitivity parameter MG and a third sensitivity parameter MB corresponding to the red component, the green component and the blue component respectively.

Specifically,

The product of the ratio coefficient of the red component, the correction parameter of the red component and the first sensitivity parameter is taken as a first sensitization coefficient correction parameter of the red component, that is, the first sensitization coefficient correction parameter is $MCTR = MR \times CR \times TR$;

The product of the ratio coefficient of the green component, the correction parameter of the green component and the second sensitivity parameter is taken as a second sensitization coefficient correction parameter of the green component, that is, the second sensitization coefficient correction parameter is $MCTG = MG \times CG \times TG$;

The product of the ratio coefficient of the blue component, the correction parameter of the blue component and the third sensitivity parameter is taken as a third sensitization coefficient correction parameter of the blue component, that is, the third sensitization coefficient correction parameter is $MCTB = MB \times CB \times TB$; and Then, the first adjustment parameter is corrected according to the first sensitization coefficient correction parameter, the second sensitization coefficient correction parameter and the third sensitization coefficient correction parameter.

Similarly, the first adjustment parameter is obtained after the above step 106, which is an adjustment parameter without considering color. Now that we have different sensitization coefficient correction parameters MCTR, MCTG and MCTB of three color components, we can correct the first adjustment parameter, so as to obtain the corrected first adjustment parameter which suits the habit of personalized human eyes more. For example, human eyes are sensitive to red R, so when the R value component of the background environment is large, the illumination value will be considered high. In this case, the illumination value of the display parameters of the display screen can be increased. Because different persons/populations have different sensitivity levels to the illumination of red, the increase degree is determined according to the personalization of a person/population, so as to match the background environment. Therefore, when the illumination of the display screen is adjusted according to the MCTR value, the first adjustment parameter should be raised in a personalized manner. On the contrary, when the first adjustment parameter is to adjust the light compensation output of the lighting compensation device for background light, it can be considered that the background light is already strong enough, and the intensity of the background light only needs to be adjusted slightly. How much to adjust is determined by the sensitivity of different persons/populations.

Therefore, the first sensitivity parameter is specifically a first standardized sensitivity parameter or a first personalized sensitivity parameter, the standardized sensitivity parameter is based on statistics of all people or a certain type of people, and the personalized sensitivity parameter is a certain user's personalized sensitivity parameter, which can be recorded based on the user's ID. Similarly, the second sensitivity parameter is specifically a second standardized sensitivity parameter or a second personalized sensitivity parameter, and the third sensitivity parameter is specifically a third standardized sensitivity parameter or a third personalized sensitivity parameter.

According to the principle of big data processing and statistics, when the personalized sensitivity parameters of many people are directed towards the same direction or their trend values are similar, the coefficient correction parameter CT can be adjusted to approach the personalized correction parameter MCT, so that there is less personalized adjustment, that is, when the correction ratio of the first adjustment parameter exceeds a set ratio, the method also comprises: updating the correction parameters corresponding to the red component, the blue component and the green component according to the first sensitization coefficient correction parameter, the second sensitization coefficient correction parameter and the third sensitization coefficient correction parameter.

The self-adaptive adjustment method based on the ambient light distribution field by the present invention analyzes the illumination of the background image based on the illumination information of the pixels/multi-pixel blocks of the background image, thus having the following advantages:

1. The background environmental image is a visual field directly facing the user's eyes, so it can truly reflect the illumination of the use environment;

2. Because the analysis of the environmental image can be larger than the visual field of the user, the whole situation of the current use environment can be reflected, and the illumination of the display of the electronic device or the light compensation output parameters of the lighting compensation device can be adjusted based on the illumination analysis of the whole background image;

Therefore, after the user adjusts the illumination of the display of the electronic device by using the method of the invention or compensates or adjusts the illumination by using the lighting compensation device, the eyes of the user feel very comfortable when the electronic device is used, thereby protecting the eyes and vision of all users.

Professionals should further realize that the units and algorithm steps of each example described in connection with the embodiments disclosed herein can be implemented in electronic hardware, computer software or a combination of the two. In order to clearly explain the interchangeability of hardware and software, the components and steps of each example have been generally described according to functions in the above description. Whether these functions are implemented in hardware or software depends on the specific application and design constraints of the technical scheme. Professionals can use different methods to implement the described functions for each specific application, but such implementation should not be considered beyond the scope of the invention.

The steps of a method or algorithm described in connection with the embodiments disclosed herein may be implemented in hardware, a software module executed by a processor, or a combination of the two. The software module can be placed in a random-access memory (RAM), memory, read-only memory (ROM), electrically programmable ROM, electrically erasable programmable ROM, register, hard disk, removable magnetic disk, CD-ROM, or storage media in other forms known in the technical field.

The above-mentioned specific embodiments further explain the purpose, technical scheme and beneficial effects of the present invention in detail. It should be understood that the above embodiments are only specific ones of the present invention and are not used to limit the scope of protection of the present invention. Any modification, equivalent substitution, improvement, etc. made within the spirit and principles of the present invention should be included in the scope of protection of the present invention.

What is claimed is:

1. A self-adaptive adjustment method based on an ambient light distribution field, wherein the method comprises:
    obtaining a background image of a background environment in a viewing angle range of a user;
    obtaining pixel information of a single pixel or multi-pixel block in the background image;
    calculating or extracting illumination information of the pixel or pixel block from the pixel information;
    obtaining I37 and continuous background image illumination field information according to the illumination information;
    performing matching calculation by using the background image illumination field information and preset illumination field distribution models to obtain corresponding first illumination field distribution model;
    querying a model-parameter list which records adjustment parameters corresponding to the illumination field distribution models to obtain a first adjustment parameter corresponding to the first illumination field distribution model; and
    adjusting display parameters of a display screen of a user terminal and/or adjusting light compensation output parameters of a lighting compensation device according to the first adjustment parameter, so that the display parameters of the display screen match with an illumination state of the background environment in the viewing angle range of the user.

2. The self-adaptive adjustment method based on the ambient light distribution field according to claim 1, wherein the calculating illumination information of the pixel or pixel block from the pixel information includes, the pixel information includes color information, and the illumination information of the pixel/pixel block is calculated according to the color information.

3. The self-adaptive adjustment method based on the ambient light distribution field according to claim 1, wherein performing matching calculation by using the background image illumination field information and preset illumination field distribution models to obtain corresponding first illumination field distribution model includes:
    matching with the preset illumination field distribution models according to the background image illumination field information to obtain one or more matching models and matching coefficients; and performing model correction and calculation based on each of the matching models and matching coefficients to obtain the first illumination field distribution model.

4. The self-adaptive adjustment method based on the ambient light distribution field according to claim 3, wherein performing model correction calculation based on each matching model and matching coefficient to obtain the first illumination field distribution model includes:
determining a matching model with a highest matching coefficient as a model to be corrected; and
performing deviation correction calculation on the model to be corrected according to other models, except the matching model to be corrected, of the plurality of matching models and corresponding matching coefficients to obtain the first illumination field distribution model.

5. The self-adaptive adjustment method based on the ambient light distribution field according to claim 3, wherein the performing model correction and calculation based on each of matching models and matching coefficients to obtain the first illumination field distribution model includes:
weighting model parameters of the matching models according to the matching coefficients to obtain weighted model parameters; and
generating the first illumination field distribution model according to the weighted model parameters.

6. The self-adaptive adjustment method based on the ambient light distribution field according to claim 3, wherein the performing model correction and calculation based on each of matching models and matching coefficients to obtain the first illumination field distribution model includes:
selecting the matching model with a highest matching coefficient as the first illumination field distribution model.

7. The self-adaptive adjustment method based on the ambient light distribution field according to claim 1, wherein after querying the model-parameter list, the method further includes:
when no illumination model matching the first illumination field distribution model is found, storing the first illumination field distribution model, and generating a record; and
when the amount of record of the first illumination field distribution model reaches a preset threshold, setting corresponding adjustment parameters for the first illumination field distribution model, and adding the adjustment parameters into the model-parameter list.

8. The self-adaptive adjustment method based on the ambient light distribution field according to claim 2, wherein the method further includes: determining RGB color values of each pixel or pixel block according to the color information, and summing values of a red component, a green component, and a blue component in all the RGB color values of the background image to obtain a total chromatic value of each component and a total chromatic value of all the components.

9. The self-adaptive adjustment method based on the ambient light distribution field according to claim 8, wherein the method further includes:
calculating ratio coefficients of the red component, the blue component and the green component based on the total chromatic value;
querying correction parameters corresponding to the red component, the blue component and the green component;
taking the product of the ratio coefficient of the red component and the correction parameter of the red component as a first coefficient correction parameter of the red component;
taking the product of the ratio coefficient of the green component and the correction parameter of the green component as a second coefficient correction parameter of the green component;
taking the product of the ratio coefficient of the blue component and the correction parameter of the blue component as a third coefficient correction parameter of the blue component; and
correcting the first adjustment parameter according to the first coefficient correction parameter, the second coefficient correction parameter and the third coefficient correction parameter, and adjusting display parameters of a display screen of a user terminal and/or adjusting light compensation output parameters of a lighting compensation device according to the corrected first adjustment parameter, so that the display parameters of the display screen match with an illumination state of the background environment in the viewing angle range of the user.

10. The self-adaptive adjustment method based on the ambient light distribution field according to claim 9, wherein the method further includes: calling a first sensitivity parameter, a second sensitivity parameter and a third sensitivity parameter corresponding to the red component, the green component, and the blue component respectively;
taking the product of the ratio coefficient of the red component and the correction parameter of the red component as a first coefficient correction parameter of the red component, the product of the ratio coefficient of the green component and the correction parameter of the green component as a second coefficient correction parameter of the green component, and the product of the ratio coefficient of the blue component and the correction parameter of the blue component as a third coefficient correction parameter of the blue component includes:
taking the product of the ratio coefficient of the red component, the correction parameter of the red component and the first sensitivity parameter as a first sensitization coefficient correction parameter of the red component; taking the product of the ratio coefficient of the green component, the correction parameter of the green component and the second sensitivity parameter as a second sensitization coefficient correction parameter of the green component; and taking the product of the ratio coefficient of the blue component, the correction parameter of the blue component and the third sensitivity parameter as a third sensitization coefficient correction parameter of the blue component;
correcting the first adjustment parameter according to the first coefficient correction parameter, the second coefficient correction parameter and the third coefficient correction parameter includes: correcting the first adjustment parameter according to the first sensitization coefficient correction parameter, the second sensitization coefficient correction parameter and the third sensitization coefficient correction parameter;
wherein the first sensitivity parameter is a first standardized sensitivity parameter or a first personalized sensitivity parameter, the second sensitivity parameter is a second standardized sensitivity parameter or a second personalized sensitivity parameter, and the third sensitivity parameter is a third standardized sensitivity parameter or a third personalized sensitivity parameter; and when a correction ratio of the first adjustment parameter exceeds a set ratio, the method further includes:

updating the correction parameters corresponding to the red component, the blue component and the green component according to the first sensitization coefficient correction parameter, the second sensitization coefficient correction parameter and the third sensitization coefficient correction parameter.

* * * * *